Figure 1:
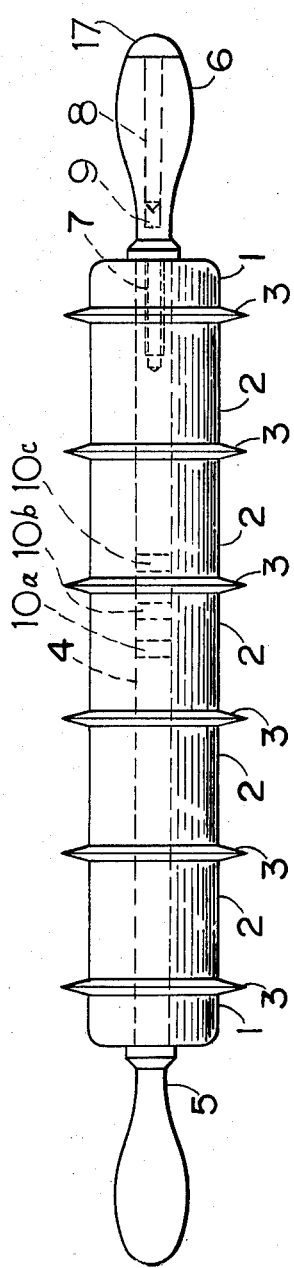

United States Patent [19]

Kuzyk

[11] 3,994,652
[45] Nov. 30, 1976

[54] COMBINED ROLLING PIN AND DOUGH CUTTER

[76] Inventor: Peter Kuzyk, 1281 Kildare Road, Windsor, Ontario, Canada, N8Y 3H7

[22] Filed: May 12, 1975

[21] Appl. No.: 576,670

[52] U.S. Cl. ............................... 425/298; 7/13.1; 30/307; 425/194; 425/374
[51] Int. Cl.² .......................................... A21C 3/02
[58] Field of Search ...................... 29/110.5; 7/13.1; 425/183, 184, 194, 291–293, 296, 298, 299, 302, 374; 30/307, 319, 365

[56] References Cited
UNITED STATES PATENTS

| 7,482 | 7/1850 | Pepper | 30/307 |
| 55,718 | 6/1866 | Sanders | 425/374 |
| 116,258 | 6/1871 | Bean | 83/490 |
| 220,669 | 10/1879 | Scarborough | 7/13.1 |
| 359,480 | 3/1887 | Weber | 30/307 |
| 448,476 | 3/1891 | Deiner | 7/13.1 |
| 1,385,916 | 7/1921 | Harris | 29/110.5 |

*Primary Examiner*—Francis S. Husar
*Assistant Examiner*—Carl Rowold
*Attorney, Agent, or Firm*—Charles Krassov

[57] ABSTRACT

This invention consists of a combined rolling pin and dough cutter. It is made up mainly of a central shaft provided with a handle at each end, and a series of abutting cylindrical rollers, all of the same diameter, rotate freely upon the central shaft to function as a rolling pin. To perform as a dough cutter, a series of circular cutting discs are inserted between the rollers. These discs are of a larger diameter than the rollers, so that their cutting edge extends beyond said rollers. One handle of the shaft is permanently fixed to the shaft while the other handle unscrews from the shaft to allow the insertion of the rollers and discs. One of the handles of the shaft is bored with a longitudinal hole into which is inserted a center pin which is used for cutting circular sections of dough used in pie making. This is accomplished by inserting the center pin into holes provided in the central shaft, inserting one of the cutting discs a predetermined distance from the center pin, and rotating the cutting disc in a circle with the center pin as its center.

1 Claim, 6 Drawing Figures

U.S. Patent    Nov. 30, 1976    3,994,652

COMBINED ROLLING PIN AND DOUGH CUTTER

This invention relates generally to utensils used in dough making, and particularly to rolling pins and dough cutters.

Usually the rolling pin and the various dough cutters are separate units. This has many disadvantages. Although the rolling pin remains as a separate unit, a large variety of various cutters are required for the purpose of cutting the dough into various required shapes. This of course involves a comparatively large investment in such cutters; and frequently these items become misplaced or permanently lost, resulting in time and monetary loss.

Quite often in the cutting of the dough an ordinary kitchen knife is used. This results in a loss of uniformity of the original dough slices as well as in the finished baked product, which is also detrimental to its appearance.

It is therefore the primary object of this invention to provide a rolling pin for rolling out the dough into sheets and than, by means of a rapid and simple conversion, to change the rolling pin into a dough cutter.

Another object of the invention is to provide a dough cutter which will in a single passage of the cutter, in one direction, cut a multiplicity of dough sections of uniform width, while the passage of the cutter in two opposite directions will provide an even greater number of dough sections of various uniform shapes.

And yet another object of the invention is to provide a dough cutter which is adjustable to cut circular dough sections of various diameters.

The above advantages are accomplished in the invention by combining the two units into one interchangeable combination.

Figure 2:
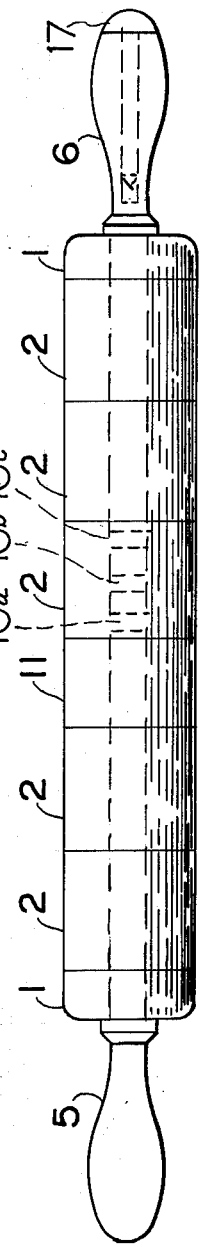
Figure 3:
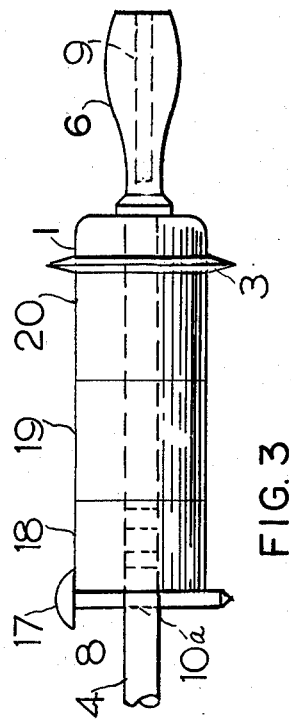
Figure 4:
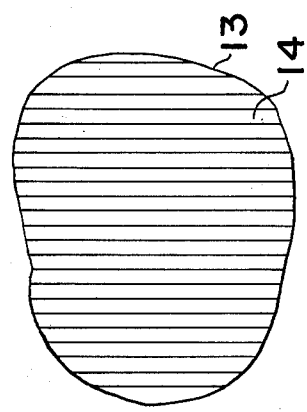
Figure 5:
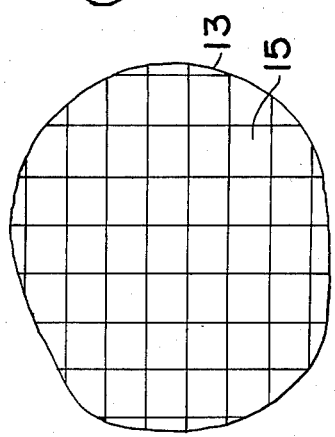
Figure 6:
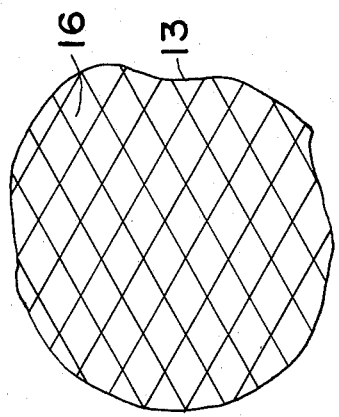

In describing the invention reference will be made to the attached drawings in which, FIG. 1 shows a side elevation of the invention used as a cutter, FIG. 2 is the same elevation showing the invention used as a rolling pin, FIG. 3 is a part elevation showing the use of a center pin for cutting circular dough sections, FIG. 4 shows a rolled out sheet of dough which has been cut into longitudinal strips, FIG. 5 shows a similar dough sheet which has been cut into rectangular sections, and FIG. 6 shows a similar dough sheet cut into diamond shaped sections.

In the drawings the invention is shown to consist of a central cylindrical shaft 4 having a permanently attached handle 5 at one end, and a removable handle 6 at its other end, which is attached to the shaft 4 by being screwed into a tapped hole 7 in the shaft 4. A pair of end rollers 1, 1, abut against, and are held by the handles 5, and 6; in between the end rollers is a plurality of somewhat wider intermediate rollers 2, of the same diameter as the rollers 1; and in between the rollers 2 is a series of uniform circular cutting discs 3 which are provided with a sharp cutting edge which extends beyond the rollers 1 and 2.

The said rollers and discs are held together tightly against each other but are free to rotate upon the said central shaft.

In FIGS. 1 and 2, the handle 6 is shown bored with a centrally located hole 9 in which is snugly stored a center pin 8, which is provided with a partly spherical head 17 which conforms with the outline of the handle 6. At this point it should be noted that either one of the handles can be used for storing the center pin 8, however, the handle in which it is stored should be provided with a flat end to compensate for the head 17 as shown in FIG. 3.

When the cutter is converted into a rolling pin as shown in FIG. 2, the cutting discs 3, are removed, and the space occupied by the discs 3 is filled in by a make up roller 11 the width of which is equal to the total width of the removed discs.

For the purpose of using the cutter to cut a circular section of dough, such as are used in pie making, the central shaft 4, is provided with several spaced vertical holes 10a, 10b, and 10c, into which the center pin 8 is inserted and held. Next to the pin 8, a set of make up rollers 18, 19, and 20, are inserted on the shaft 4; next to that a cutter 3; then an end roller 1; and finally the handle is screwed back onto the central shaft 4. The point 8 is inserted into the dough sheet and the cutter is rotated a complete circle. Usually pies are made into several standard sizes, therefore, the holes 10a, 10b, and 10c, are so located upon the shaft 4 to provide a circular sheet of dough of the required diameter. By way of example, when the pin 8 is in hole 10a the diameter of the sheet could be 14 inches; when in hole 10b, 12 inches, and when in hole 10c, 10 inches.

FIGS. 4, 5, and 6, show the versatility of the cutter. Thus, to cut a batch of noodles, the cutter is run vertically across the dough sheet 13, then moved over a distance equal to the required width of the noodles and the cutting process is reapted to form a number of cuts 14 until the entire sheet is covered as shown in FIG. 4. Similarly, rectangular sections of dough can be cut by running the cutter in two opposite directions at right-angles to each other; and diamond shaped sections can be obtained by running the cutter in two directions at any other angle to each other, as shown in FIGS. 5 and 6.

From the above description it can be seen that the number of shapes into which the dough can be cut by the use of this invention is almost limitless.

The invention can be manufactured from wood, metal, plastic, or a combination of the above materials. The cutters 3 would preferably be made of a stainless metal, while the other components if made of metal or plastic could be of hollow construction.

I claim:

1. A rolling pin which can be converted into a dough cutter comprising in combination a cylindrical shaft having a handle at each end thereof, one of said handles being permanently fixed to said shaft while the other handle is screwably removable and reattachable to said shaft; a plurality of equal diameter rollers of various widths which rotate freely upon said central shaft; a pair of end rollers of the same diameter as the above mentioned rollers but having their outer edges rounded; a plurality of identical sharp rimmed circular cutting discs inserted between all or some of said rollers and which are free to rotate upon said central shaft, said discs being of a larger diameter than said rollers; a center pin consisting of a pointed shaft with a head at the blunt end thereof, which acts as a center pin for cutting circular sections of dough; a longitudinal hole in one of said handles for storing said center pin therein when not in use; and a set of spaced holes through said central shaft for inserting said center pin when said cutter is used for cutting circular dough sections.

* * * * *